US008341400B2

(12) United States Patent
Agrawal et al.

(10) Patent No.: US 8,341,400 B2
(45) Date of Patent: *Dec. 25, 2012

(54) METHOD AND APPARATUS FOR ACHIEVING NONCONFORMANT PUBLIC KEY INFRASTRUCTURES

(75) Inventors: Sunil Agrawal, Milpitas, CA (US);
Andrei Sheretov, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,668

(22) Filed: Aug. 10, 2011

(65) Prior Publication Data

US 2011/0296173 A1    Dec. 1, 2011

Related U.S. Application Data

(63) Continuation of application No. 11/546,115, filed on Oct. 10, 2006, now Pat. No. 8,010,784.

(51) Int. Cl.
*H04L 29/06* (2006.01)

(52) U.S. Cl. ........................................................ 713/156

(58) Field of Classification Search .................... 713/157
See application file for complete search history.

(56) References Cited

U.S. PATENT DOCUMENTS

| 2003/0018890 A1* | 1/2003 | Hale et al. ................ 713/156 |
| 2003/0172299 A1 | 9/2003 | Gunter |
| 2004/0039906 A1 | 2/2004 | Oka et al. |
| 2005/0055315 A1 | 3/2005 | Darweesh et al. |
| 2005/0160476 A1* | 7/2005 | Kakii .............................. 726/5 |
| 2005/0228886 A1 | 10/2005 | Cain et al. |
| 2008/0086635 A1 | 4/2008 | Agrawal et al. |

FOREIGN PATENT DOCUMENTS

| WO | WO-2004114046 | 12/2004 |
| WO | WO-2008045870 A2 | 4/2008 |
| WO | WO-2008045870 A3 | 4/2008 |

OTHER PUBLICATIONS

"U.S. Appl. No. 11/546,115, Final Office Action mailed Jan. 3, 2011", 10 pgs.
"U.S. Appl. No. 11/546,115, Non-Final Office Action mailed Jan. 21, 2010", 9 pgs.
"U.S. Appl. No. 11/546,115, Non-Final Office Action mailed Jul. 22, 2010", 11 pgs.

(Continued)

*Primary Examiner* — Yin-Chen Shaw
*Assistant Examiner* — Harris Wang
(74) *Attorney, Agent, or Firm* — Schwegman Lundberg Woessner P.A.

(57) ABSTRACT

Method and apparatus are described wherein, in one example embodiment, a public key certificate issued by a certificate authority includes at least one characteristic that conforms to at least one rule established for the operation of a public key infrastructure. An attribute certificate is issued to be used to modify the public key certificate in accordance with information contained in the attribute certificate to create a modified public key certificate wherein the at least one characteristic is modified so as to be non-conformant with the at least one rule. According to one example embodiment, the attribute certificates may be distributed by a certificate authority, or embedded in an application that includes an engine that is used to modify the conforming public key certificate.

21 Claims, 5 Drawing Sheets

OTHER PUBLICATIONS

"U.S. Appl. No. 11/546,115, Notice of Allowance mailed Apr. 25, 2011", 7 pgs.

"U.S. Appl. No. 11/546,115, Response filed Mar. 3, 2011 to Final Office Action mailed Jan. 3, 2011", 15 pgs.

"U.S. Appl. No. 11/546,115, Response filed Apr. 21, 2010 to Non-Final Office Action mailed Jan. 21, 2010", 10 pgs.

"U.S. Appl. No. 11/546,115, Response filed Oct. 22, 2010 to Non-Final Office Action mailed Jul. 22, 2010", 12 pgs.

"International Application Serial No. PCT/US2007/080804, International Search Report mailed Dec. 19, 2008", 9 pgs.

"International Application Serial No. PCT/US2007/080804, Written Opinion mailed Dec. 19, 2008", 6 pgs.

* cited by examiner

FIG. 1

| ATTRIBUTE CERTIFICATE (AC) SCHEMA | | 200 |
|---|---|---|
| POINTER | | 201 |
| ATTRIBUTE A | INDICATOR A | |
| ATTRIBUTE B | INDICATOR B | |
| ⋮ | ⋮ | |
| ATTRIBUTE N | INDICATOR N | |

METHOD AND APPARATUS FOR ACHIEVING NONCONFORMANT PUBLIC KEY INFRASTRUCTURES

CLAIM OF PRIORITY

This application is a continuation of U.S. application Ser. No. 11/546,115, filed Oct. 10, 2006, which application is incorporated in its entirety herein by reference.

TECHNICAL FIELD

The subject matter relates generally to the field of computer security, and more particularly to public key infrastructures.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, Adobe Systems Inc. All Rights Reserved.

BACKGROUND

In cryptography, a public key infrastructure (PKI) is an arrangement that provides for trusted third party vetting of, and vouching for, user identities. It also allows binding of public keys to users. This is usually carried out by software at a central location together with other coordinated software at distributed locations. The public keys are typically distributed in public key certificates (PKCs) that are usually distributed by a Certificate Authority (CA). PKI arrangements enable users to be authenticated to each other, and to use the information in identity certificates (e.g., each other's public keys) to encrypt and decrypt messages. In general, a PKI consists of client software, server software such as a Certificate Authority, hardware (e.g., smart cards), and operational procedures. A user may digitally sign messages using his private key, and another user can check that signature using the public key contained in that user's certificate issued by a Certificate Authority within the PKI. This enables two (or more) communicating parties to establish confidentiality, message integrity, and user authentication without having to exchange any secret information in advance.

Many enterprise-scale PKI systems rely on certificate chains to establish a party's identity, as a certificate may have been issued by the Certificate Authority computer whose 'legitimacy' is established for such purposes by a certificate issued by a higher-level Certificate Authority, and so on. This produces a certificate hierarchy composed of, at a minimum, several computers, often more than one organization, and often assorted interoperating software packages from several sources. For this purpose, a certification path validation algorithm may be used to verify that a given certificate path is valid under a given public key infrastructure. A path starts with the subject certificate and may proceed through a number of intermediate certificates up to a trusted root certificate, typically issued by a trusted Certification Authority.

Standards are critical to PKI operation, and public standards are critical to PKIs intended for extensive operation. Some of the standards for PKI infrastructures are provided by the IETF PKIX working group (PKIX-WG), for example as stated in RFC 3280 and related RFCs. However most of the PKIs do not follow exactly the RFC rule set. For example, RFC 3280 requires that all the PKCs that are CAs must have the Basic Constraint extension, and must assert the CA bit. If not, then the PKC can't be considered as a CA. Some of the intermediate CAs in Europe, for instance, may not follow this PKI rule and do not include any Basic Constraint extension within the PKC. Accordingly, such CAs may not be compatible with some RFC 3280 rules. Examples of other nonconformant PKC attributes may include Validity Dates, Key-Usage, Extended Key Usage, CRL Distribution Point, Authority Information Access, Subject Key Identifier, Authority Key Identifier, or Certificate Policy.

In order to accommodate non-compliant PKCs, some PKI engines may include configurability options for each capability where the PKIs can diverge from the RFCs. Users of such non-conformant PKI engines are then provided documentation explaining how to configure their application (manually) to accommodate or work around the non-conformant performance of the PKI engine. However, such manual configuration is undesirable for a variety of reasons.

DETAILED DESCRIPTION

In the following detailed description, reference is made to the accompanying drawings that form a part hereof, and in which are shown, by way of illustration, specific embodiments in which the inventive subject matter can be practiced. It is understood that other embodiments may be utilized and structural changes may be made without departing from the scope of the inventive subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

According to one example embodiment, the inventive subject matter disclosed herein provides for the use of Attribute Certificates (ACs), as for example but not limited to, those of the type or kind defined in RFC 3281, to modify Public Key Certificates (PKCs) so that PKCs can be made conformant to one or more rules of a standard. Accordingly, an otherwise non-conformant PKI engine may process all PKCs in accordance with the applicable rules or the standard without encountering exceptions. Thus, the need for manual configuration of a PKI engine is avoided.

Figure 1:
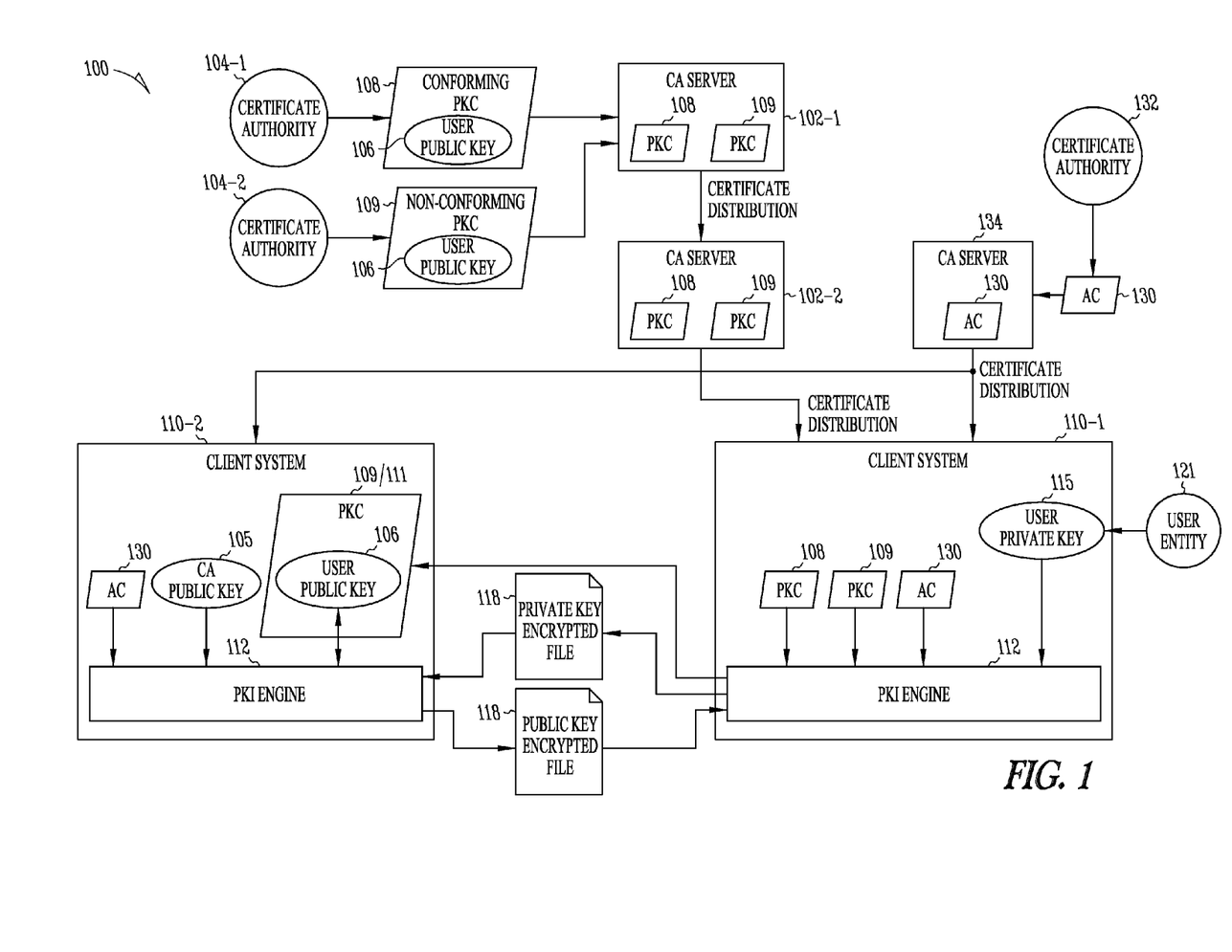
FIG. 1 illustrates a system and uses thereof according to one example embodiment of the inventive subject matter disclosed herein.

Referring now to FIG. 1, there is illustrated a simplified example PKI 100 according to one example embodiment of the inventive subject matter described herein. PKI 100 includes one or more Certificate Authority (CA) servers 102. CA server 102-1 may distribute public key certificates (PKCs) 108 or 109, issued by a CA authority 104-1 or 104-2, to one or more intermediate CA servers 102-2. A PKC 108 or 109 may be issued for an entity 121 that holds a private key 115 that is paired with a public key 106 in the PKC 108. Server 102-2 may in turn distribute PKCs 108 to PKI client systems 110, for example client system 110-2. Alternatively, server 102-1 may distribute certificates directly to the client systems 110-1 or 100-2. A PKC 108 may, in one example embodiment, include: i) a public key being signed; ii) a name, which can refer to a person, a computer, or an organization; iii) a validity period; iv) the location (URL) of a revocation center; and v) the digital signature of the certificate, produced by the CA's private key. The CA 104-1 or 104-2 hold a private key that may be used to sign PKCs 108 or 109, which in turn may be validated using the paired public key 105 for the CA. In one example embodiment, a PKC 108 issued by CA entity 104-1 is compliant with or conforms to a standard governing the operation of the PKI 100, such as the X509 standard. Another PKC 109 issued by CA entity 104-2 is not compliant or is non-conforming with the standard governing the PKI 100, for example because it has one or more characteristics that do not conform to the standard. If such a non-conforming PKC 109 is received at a PKI engine 112, the engine 112 may be unable to use it unless it is manually configured or reprogrammed to accommodate the non-conforming attributes of the PKC 109.

The one or more client systems 110, which include a hardware computing platform such as a workstation, personal computer, server system, or other computing system, include a client PKI engine 112. In one embodiment, a PKC 108 or 109, signed by the CA 104, is distributed from a CA server, such as server 102-2, to a client system 110, for example 110-1. Client system 110-1 may hold the private key 115 corresponding to the PKC 108 or 109. In the event the PKC is a conforming PKC 108, system 110-1 may use it, for example, in order to assist in establishing a secure communication or exchange of information between system 110-1 and system 110-2, pursuant to one or more currently known or later developed PKI modes of operation, without encountering exceptions. For example, the PKC 108 may be sent to system 110-2, and using the public key provided by the certificate authority 104-1, be validated and opened to obtain public key 106 for user entity 121.

In one example embodiment, the public key 105 for the CA entity 104 may be kept in a secure key list on the client system 110. Once the public key 106 associated with the user entity 121 is verified by the trusted relationship with CA 104, the public key 106 can be used in combination with the private key 115 also held by user entity 121 to establish secure communications or data exchange. The public key 106 may be used, for example, to authenticate and open a file signed with private key 115. File 118 may use, for example, the portable document format (PDF) established by Adobe Systems, Inc. The public key 106 may also be used by system 110-2 to sign files or transmissions such that such files or transmissions may only be opened using the associated private key 115. PKC 108 may further include additional information, policies or permissions associated with the public key 106 and entity 121. This information may be used by a PKI engine 112 to control how the public key 106 is used or for other purposes.

According to one example embodiment, system 110-1 may also receive a non-conforming PKC 109 that, if used by the system 110-1 for signing, may be unverifiable by a receiving entity such as system 110-2 due to PKC 109's non-compliance with a standard. Accordingly, in one example embodiment, system 110-2 may use one or more ACs 130 to conform a PKC 109 received from a signor system 110-1. Client system 110-2 may use the ACs 130 to conform the PKC 109 to one or more rules of the standard. For this purpose, engine 112 of client system 110-2 may retrieve one or more Attribute Certificates (ACs) 130 issued from a trusted CA. An AC 130, in one example embodiment, may be issued by a CA server 134. The CA server 134 may issue AC 130 with a pointer to the PKC 109. Such pointer, for example, may be provided as described in a standard, such as but not limited to the standard defined in RFC 3281. According to one example embodiment, as described in more detail below, the AC 130 is used by the PKI engine 112 to modify the associated non-conforming PKC 109 to create a modified PKC 111 that conforms entirely or at least in part to a desired rule or standard. The conforming PKC 111 may then be used by the engine 112 of system 110-1 without modification and/or configuration of the engine 112, allowing it to accommodate the non-conforming aspects of PKC 109

According to still another example embodiment, the required ACs 130 may be embedded in the PKI engine 112 or an application containing the engine 112 in a local storage location in the client system 110, so that they do not need to be distributed by a CA. Such an application may be a document reader or authoring client, such a client application may be, for example selected from Adobe Acrobat® line of programs, available from Adobe Systems, Inc. According to still another example embodiment, an AC 130 may be distributed or embedded by the publisher or distributor of an application, wherein the application includes a PKI engine that requires compliance with one, several, or all rules of a standard that PKCs within the PKI do not conform to. Accordingly, the publisher or distributor may enable or assure that their application will be capable of working properly in the PKI without requiring manual configuration of the application.

According to another example embodiment, the engine 112 of system 110-1 obtains, as part of the signing process, all the PKCs, for example PKC 109 and any other PKCs in the chain above PKC 109, that are required to build a validation chain from the end entity certificate to a trusted CA. According to one example embodiment, some the other PKCs in the chain may be conforming PKCs and some may be non-conforming. These PKCs may be obtained, for example, using any acceptable process, for example using an Authority Information Access extension, or fetching them from an Address book for the PKI. In addition, the PKI engine 112 may also obtain all the associated ACs 130, for example in the same way the PKCs are obtained. Or, as noted above, the ACs 130 may be embedded in a client application including the engine 112, or in the engine 112 proper. As described further below, all of the source PKCs in the certificate chain and associated ACs used to conform the nonconforming PKC 109, may be embedded in any file signed by the engine 112 using the PKC 109, allowing the any system receiving the signed document to validate the PKCs and any associated ACs. Once verified, the compliant PKC 111 created by the engine 112 in system 110-2 may be used, or example in order to establish secure exchange of information with a system 110-1.

According to one example embodiment, system 110-1 may also first conform PKC 109 to one or more rules of a standard using one or more ACs 130, prior to using the PKC 109 or any modified PKC 111 it may produce using the ACs 130. In one example embodiment, the conforming PKC 111 may then be used by system 110-1 for signing.

Figure 2A:
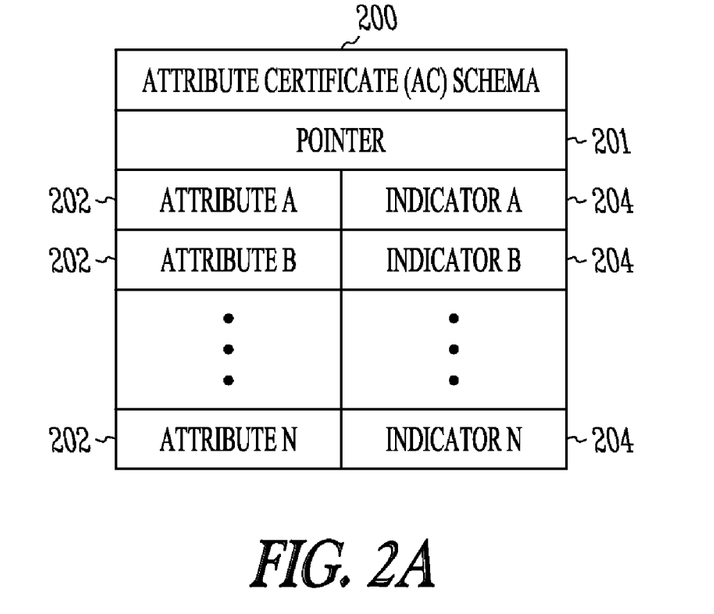
FIGS. 2A and 2B illustrate attribute certificates and uses thereof according to one example embodiment of the inventive subject matter disclosed herein.
Figure 2B:
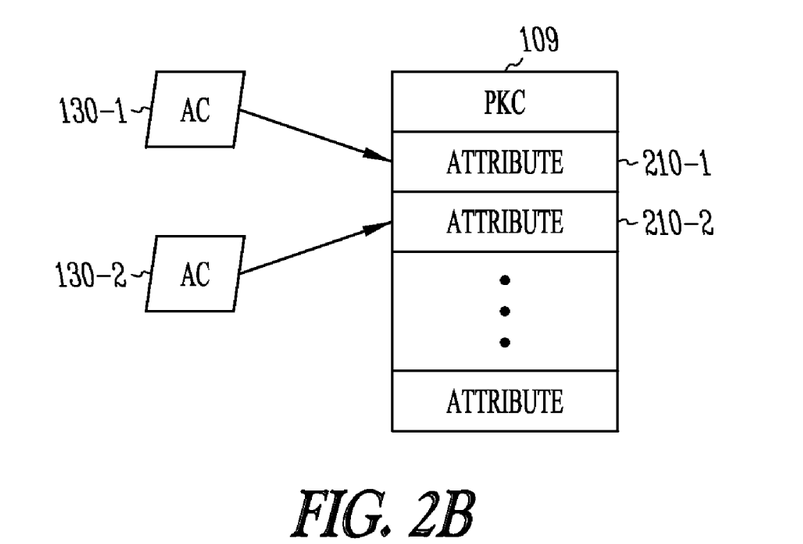

Referring now to FIGS. 2A and 2B, there is illustrated one example embodiment of a schema 200 for an AC 130. AC 130 includes a pointer 201 to a PKC, such as PKC 109. Each attribute 202 in schema 200 of AC 130 includes an indicator 204 that specifies whether it adds to or replaces the corresponding attribute 210 in a PKC, such as PKC 109. According to this example embodiment, for example but not by way of limitation, this allows the AC 130 to add to the attribute 210 already present in a PKC 109, allowing multiple ACs to be chained. Accordingly, in one example embodiment, a first AC 130-1 is provided to modify or add to a first attribute 210-1 of a PKC 109, and a second AC 130-2 is provided to modify the same or another attribute 210-2 of the same PKC 109, so that more than one AC 130 may be used to modify the PKC 109 and therefore the operation of the corresponding PKI.

Figure 3:
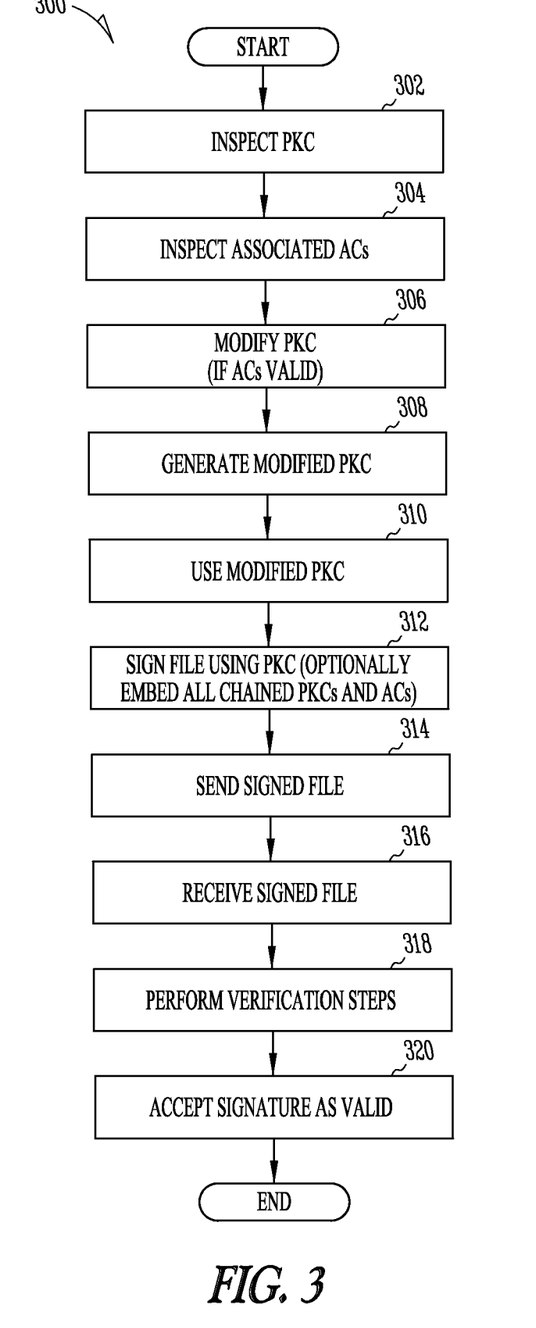
FIG. 3 illustrates a method for modifying a public key certificate according to one example embodiment of the inventive subject matter disclosed herein.

Referring now to FIG. 3, there is illustrated a method for modifying a PKC using ACs according to one example embodiment 300 of the inventive subject matter. As illustrated, during evaluation of a PKC, for example a non-compliant PKC 109, the PKI engine 112 inspects 302 the PKC and then inspects 304 all the associated ACs that have been obtained by the engine 112. Then, within the memory data structure of the system executing engine 112, all the PKC attributes or extensions (as for example defined in RFC 3280) are modified 306 as dictated by the associated ACs, to generate 308 a modified PKC, such as PKC 111, for example but not by way of limitation. According to one example embodiment, before an AC is allowed to modify a PKC attribute, all the AC validation checks described in a standard, such as but not limited to RFC 3281, are carried out by the PKI engine 112. In this embodiment, an AC may be used only if the validation checks are successful. If the validation checks are not successful, the changes attempted by the AC are rejected. According to one example embodiment, if ACs 130 are accepted and applied to modify a PKC 109 to create a modified PKC 111, the engine 112 may then evaluate the PKC 111 in the system memory against a standard, for example as defined in a RFC rule set, to determine if the modified PKC 111 is compliant with the standard.

According to one example embodiment, if a PKC 111 meets all the applicable rules for validation a system 110 may use 310 the PKC 111. In one embodiment, system 110 may sign 312 a file 118 using PKC 111 and the associated private or public key, depending on the situation. In one embodiment, all the PKCs in the validation chain and associated ACs may be embedded in the signature and in turn embedded in the data or file 118. The file 118 may be sent 314, received 316 by another system signed with the PKC 111. The other system thereafter obtains the PKCs packaged with the file 118 or if not packaged retrieves them, and performs 318 verification steps against the modified PKC 111, for example checking the signature of the PKCs, including PKC 109 against a list of trusted CAs, and/or by checking for a valid certificate chain of PKCs between the PKC 109 and the root PKC. In addition, the validity of all ACs 130 may be checked, or retrieved from the local application or engine 112 they may be embedded in. If all the checks are successful, the signature is considered valid 320.

According to still another example embodiment, an AC 130 may be used by an engine 112 not to conform a non-conforming PKC, but instead to modify a conforming PKC 108 to provide a non-conforming PKC that may include characteristics to provide a mode of operation that is different than a standard. As such, the AC 130 is used to create a non-standard PKI mode of operation or data structure. Thus, a standard-compliant PKC may be deliberately made non-compliant using an AC 130 as described herein. Further, according to another example embodiment, the CA 132 issuing an AC 130 may be the same as or different from the CA 104 that issues the PKC 109. According to still another example embodiment, the issuing authority for the AC 130 is or must be, by way of example but not by way of limitation, trusted by the PKI engine 112 to issue ACs 130. According to another example embodiment, the AC 130 may take the form of a PKC or a CA.

Figure 4:
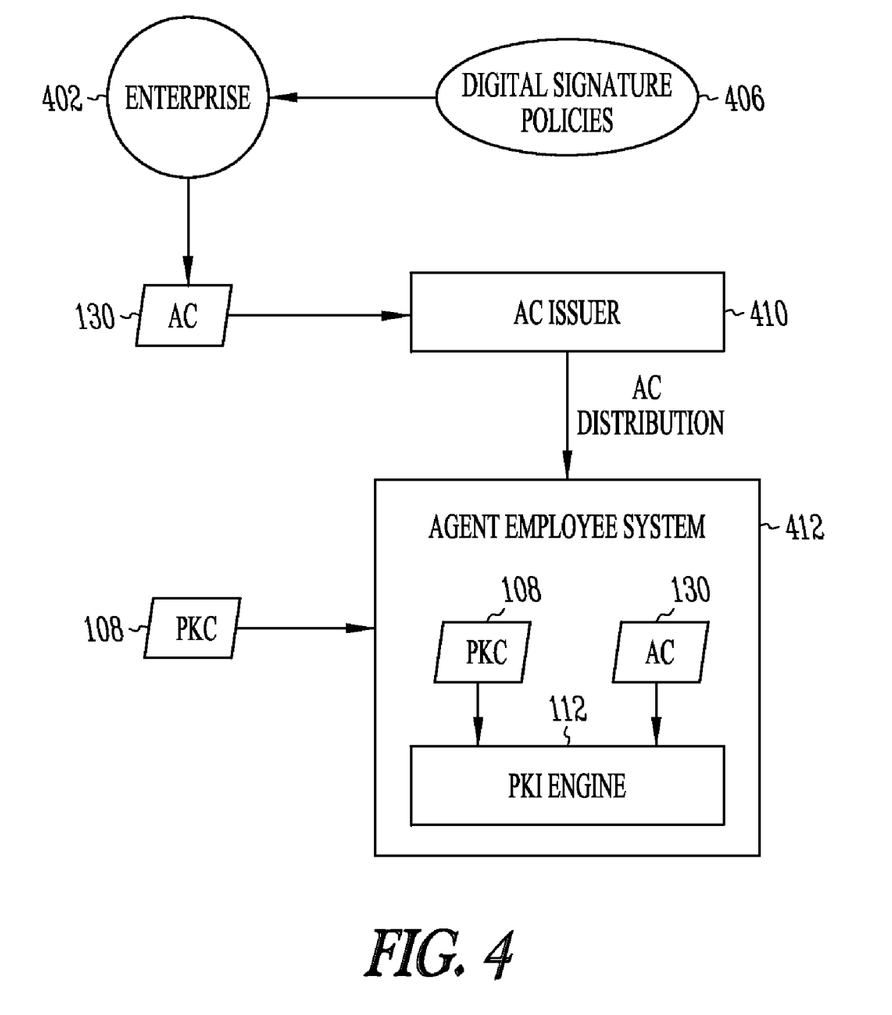
FIG. 4 illustrates a method for use of attribute certificates to modify the operation of a PKI according to one example embodiment of the inventive subject matter disclosed herein.

According to one example embodiment, the inventive subject matter disclosed herein may be employed as illustrated in FIG. 4. An enterprise 402 that wishes to evaluate PKCs 108 as per their internal digital signature policies 406, may issue an AC 130 for a PKC 108 and have the AC issuer 410 trusted by its agents or employees 412. In one example embodiment, a department in a corporation may have special rules, for example more stringent rules, on what a PKC 108 should contain, and such rules may mean that the normal corporate PKCs and PKIs are not sufficient for use by the department. Accordingly, the department may use the system and method of the inventive subject matter to establish the special rules of their desired PKI, as opposed to establishing a separate PKI that conforms to their desired rules. In this example, accordingly, the AC 130 may specify all the PKC attributes that the department wishes to modify for their special requirements. Of course, according to another example embodiment, any entity wishing to create a special set of rules may modify an existing PKI using the above-described system and method.

Figure 5:
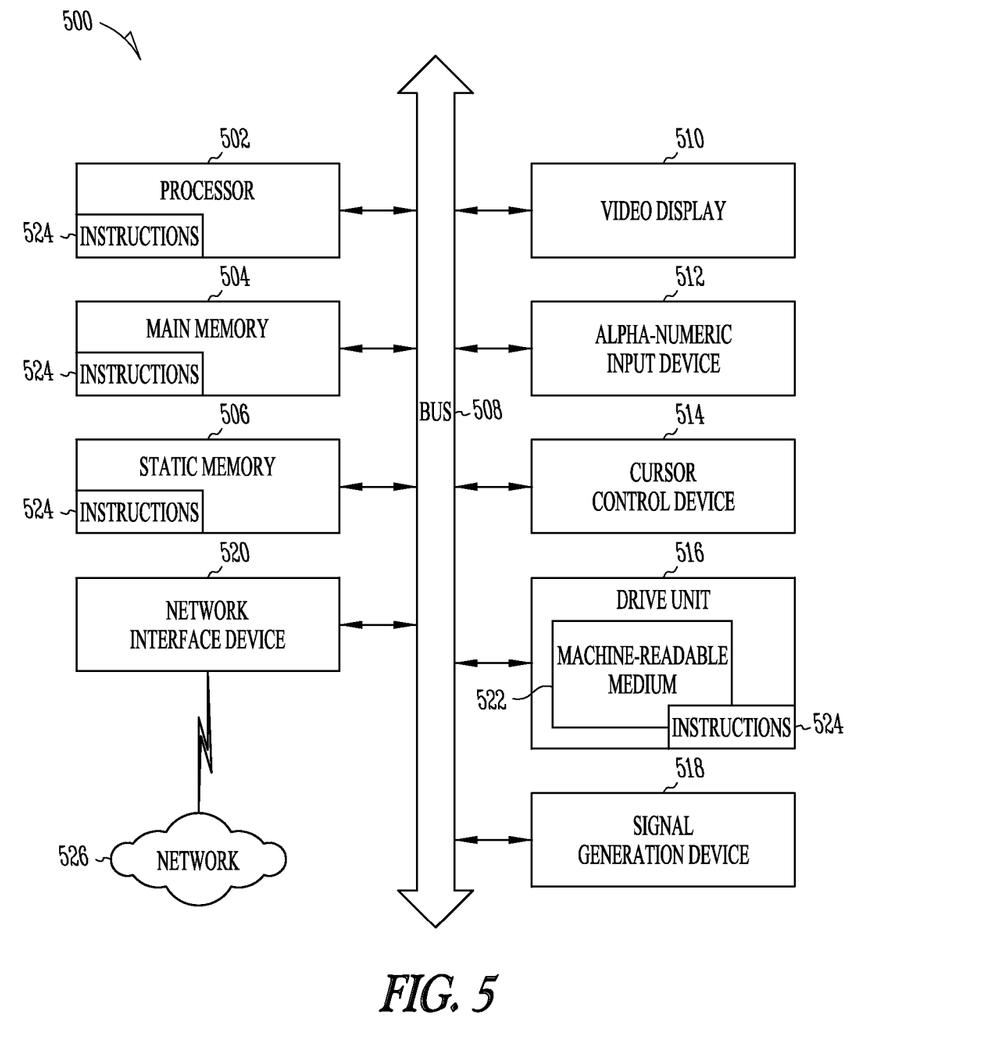
FIG. 5 illustrates a diagram of one example embodiment of a computing system architecture according to the inventive subject matter disclosed herein.

FIG. 5 shows a diagrammatic representation of a machine in the example form of a computer system 500 within which a set of instructions 524, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504, and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520. The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may further be transmitted or received over a network 526 via the network interface device 520 utilizing any one of a number of well-known transfer protocols, for example the hyper text transfer protocol (HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by, or associated with, such a set of instructions. The term "machine-readable medium" shall accordingly be taken to include, but not be limited to, solid-state memories, optical and magnetic media, and carrier wave signals.

According to one example embodiment, the systems and methods described herein may use any form of public key certificate (such as PKC 108, 109) so long as it uses a digital signature to bind together a public key with an identity and is used to establish a trust relationship in a PKI. Similarly, any form of certificate can be used for the Attribute Certificate so long as it also uses a digital signature to bind together a public key with an identity and is used to establish a trust relationship in a PKI, and provides information that may be used to modify a characteristic of a public key certificate. Accordingly, these terms should not be interpreted to require any specific characteristics dictated by a standard unless explicitly enumerated. Further, the rules of a standard for a PKI, which may be set for the purpose of guaranteeing interoperability, may be public or proprietary, and may be established by either a private or public body. According to one example embodiment, the rules of the standard for a PKI may be set by the X509 specifications, or by rules established by the ITEF PKIX-WG.

In this description, numerous specific details are set forth. However, it is understood that embodiments of the invention may be practiced without these specific details. In other instances, well-known circuits, software, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the inventive subject matter can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration. Further, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

What is claimed is:

1. A method comprising:
    receiving a public key certificate that conforms to a rule of a public key infrastructure, the rule being applicable to process the public key certificate, the public key certificate including a compliant attribute that complies with the rule;
    receiving an attribute certificate issued by a certificate authority, the attribute certificate referencing the public key certificate and including a supplemental attribute usable to render the public key certificate non-conformant with the rule of the public key infrastructure; and
    modifying the public key certificate based on the supplemental attribute included in the attribute certificate, the modified public key certificate being non-conformant with the rule.

2. The method of claim 1, wherein the modifying of the public key certificate comprises replacing the compliant attribute with the supplemental attribute within the public key certificate.

3. The method of claim 1, wherein the modifying of the public key certificate comprises adding the supplemental attribute to the public key certificate.

4. The method of claim 1, wherein the receiving of the public key certificate comprises receiving the public key certificate from a further certificate authority that is different from the certificate authority that issued the attribute certificate.

5. A non-transitory machine-readable storage medium comprising instructions that, when executed by one or more processors of a machine, cause the machine to perform operations comprising:
    receiving a public key certificate that conforms to a rule of a public key infrastructure, the rule being applicable to process the public key certificate, the public key certificate including a compliant attribute that complies with the rule;
    receiving an attribute certificate issued by a certificate authority, the attribute certificate referencing the public key certificate and including a supplemental attribute usable to render the public key certificate non-conformant with the rule of the public key infrastmructure; and
    modifying the public key certificate based on the supplemental attribute included in the attribute certificate, the modified public key certificate being non-conformant with the rule.

6. The non-transitory machine-readable storage medium of claim 5, wherein the operations further comprise checking a validity of the attribute certificate prior to the modifying of the public key certificate.

7. The non-transitory machine-readable storage medium of claim 5, wherein the modifying of the public key certificate comprises replacing the compliant attribute with the supplemental attribute within the public key certificate.

8. The non-transitory machine-readable storage medium of claim 5, wherein the modifying of the public key certificate comprises adding the supplemental attribute to the public key certificate.

9. The non-transitory machine-readable storage medium of claim 5, wherein the operations further comprise signing at least one communication using the modified public key certificate and sending the communication to another system.

10. The non-transitory machine-readable storage medium of claim 5, wherein the receiving of the public key certificate comprises receiving the public key certificate from a further certificate authority that is different from the certificate authority that issued the attribute certificate.

11. A system comprising:
a processor configured to access an attribute certificate issued by a certificate authority, the attribute certificate referencing a public key certificate that conforms to a rule of a public key infrastructure, the rule being applicable to process the public key certificate, the public key certificate including a compliant attribute that complies with the rule, the attribute certificate including a supplemental attribute usable to render the public key certificate non-conformant with the rule of the public key infrastructure and
a network interface device configured to provide the attribute certificate to another system that is configured to modify the public key certificate based on the supplemental attribute included in the attribute certificate, the modified public key certificate being non-conformant with the rule.

12. The system of claim 11, wherein the supplemental attribute is usable to render the public key certificate non-conformant with the rule by replacement of the compliant attribute with the supplemental attribute within the public key certificate.

13. The system of claim 12, wherein the attribute certificate includes an indicator that specifies the replacement by specifying the supplemental attribute as corresponding to the compliant attribute.

14. The system of claim 11, wherein the supplemental attribute is usable to render the public key certificate non-conformant with the rule by addition of the supplemental attribute to the public key certificate.

15. The system of claim 14, wherein the attribute certificate includes an indicator that specifies the addition by specifying the supplemental attribute as corresponding to the compliant attribute.

16. The system of claim 11, wherein the attribute certificate includes a pointer to the public key certificate.

17. A method comprising:
receiving a public key certificate that is compatible with one or more rules established to govern an operation of a public key infrastructure, the public key certificate including a compliant attribute that complies with the one or more rules, the one or more rules being applicable to process the public key certificate;
storing an attribute certificate issued by a certificate authority, the attribute certificate referencing the public key certificate and including a supplemental attribute usable to render the public key certificate non-conforniant with the one or more rules; and
modifying the public key certificate based on the supplemental attribute included in the attribute certificate, the modified public key certificate being non-conformant with the one or more rules.

18. The method of claim 17 further comprising checking a validity of the attribute certificate prior to the modifying of the public key certificate.

19. The method of claim 17, wherein the modifying includes replacing the compliant attribute with the supplemental attribute within the public key certificate.

20. The method of claim 17, wherein the modifying includes adding the supplemental attribute to the public key certificate.

21. The method of claim 17, wherein the storing of the attribute certificate includes storing a pointer to the public key certificate.

* * * * *

UNITED STATES PATENT AND TRADEMARK OFFICE
CERTIFICATE OF CORRECTION

PATENT NO. : 8,341,400 B2
APPLICATION NO. : 13/206668
DATED : December 25, 2012
INVENTOR(S) : Agrawal et al.

It is certified that error appears in the above-identified patent and that said Letters Patent is hereby corrected as shown below:

In the Claims

In column 8, line 57, in Claim 5, delete "infrastmructure" and insert --infrastructure--, therefor In column 9, line 25, in Claim 11, delete "and" and insert --; and--, therefor In column 10, line 21, in Claim 17, delete "non-conforniant" and insert --non-confomiant--, therefor Signed and Sealed this
Third Day of December, 2013

Margaret A. Focarino
*Commissioner for Patents of the United States Patent and Trademark Office*